United States Patent
Landini et al.

(10) Patent No.: US 8,419,062 B2
(45) Date of Patent: Apr. 16, 2013

(54) DEVICE FOR BREAKING REAR WINDOW OF A VEHICLE

(75) Inventors: Federico Landini, Modena (IT); Pierluigi Paciarelli, Modena (IT)

(73) Assignee: Maserati S.p.A., Modena (IT)

(*) Notice: Subject to any disclaimer, the term of this patent is extended or adjusted under 35 U.S.C. 154(b) by 0 days.

(21) Appl. No.: 13/092,451

(22) Filed: Apr. 22, 2011

(65) Prior Publication Data

US 2012/0049487 A1    Mar. 1, 2012

Related U.S. Application Data

(63) Continuation of application No. PCT/IT2009/000476, filed on Oct. 22, 2009.

(30) Foreign Application Priority Data

Oct. 24, 2008  (IT) .............................. RM2008A0569

(51) Int. Cl.
*B60R 21/13* (2006.01)

(52) U.S. Cl.
USPC ............................ 280/756; 180/274; 225/103

(58) Field of Classification Search .................... 30/366, 30/367; 180/271, 274; 280/748, 751, 753, 280/756; 225/103; *B60R 21/13*
See application file for complete search history.

(56) References Cited

U.S. PATENT DOCUMENTS

| | | | | |
|---|---|---|---|---|
| 5,791,056 | A * | 8/1998 | Messina | 30/361 |
| 7,028,874 | B2 * | 4/2006 | Lin | 225/93 |
| 7,198,294 | B2 * | 4/2007 | Welch | 280/756 |
| 7,407,188 | B2 * | 8/2008 | Wildig et al. | 280/756 |
| 7,717,461 | B2 * | 5/2010 | Beierl et al. | 280/756 |
| 7,988,078 | B1 * | 8/2011 | Roy et al. | 241/33 |
| 2006/0255084 | A1 * | 11/2006 | Peers-Smith et al. | 225/103 |

FOREIGN PATENT DOCUMENTS

| | | | |
|---|---|---|---|
| DE | 10316346 A1 | | 10/2004 |
| DE | 102007061064 A1 | * | 6/2009 |
| EP | 1510412 A1 | | 3/2005 |
| EP | 1652736 A1 | | 5/2006 |
| EP | 2070775 A1 | * | 6/2009 |
| EP | 2072344 A2 | * | 6/2009 |

OTHER PUBLICATIONS

International Search Report and Written Opinion issued on Dec. 30, 2009 in connection with International Application PCT/IT2009/000476, 9 pages.
International Preliminary Report on Patentability issued on Apr. 14, 2011 in connection with International Application PCT/IT2009/000476, 7 pages.

* cited by examiner

*Primary Examiner* — Joseph Rocca
*Assistant Examiner* — Laura Freedman
(74) *Attorney, Agent, or Firm* — Gesmer Updegrove LLP

(57) ABSTRACT

The device includes an actuation system, normally housed in a sleeping or rest position within a space which is inner with respect to a vehicle rear window, and that can be actuated, following a collision or accident involving the vehicle, a closure element for the space housing the actuation system, provided between the latter and the rear window. The closure element has a pin for breaking the rear window. The actuation system, after its activation, strikes the closure element, making it move, along with the at least one pin, toward said rear window. The actuation system and the closure element travel with the same speed until the end of the stroke of the actuation system, the stroke ending before the actuation system contacts the rear window, the closure element, along with the at least one pin, further prosecuting its stroke until striking the rear window, breaking the rear window.

9 Claims, 3 Drawing Sheets

DEVICE FOR BREAKING REAR WINDOW OF A VEHICLE

PRIORITY

The present application is a continuation of PCT/IT2009/00476 filed on 22 Oct. 2009, which claims priority to Italian Patent Application No. RM2008A000569 filed on 24 Oct. 2008.

BACKGROUND

The present invention relates to a device for breaking a rear window of a vehicle.

More specifically, the invention concerns a device of the above kind permitting obtaining breaking of the rear window both if roll bar is provided or not.

At present, breaking of the rear window occurs by one or more very tough conical pins, which are integral with the upper crossbar of the roll bar and projecting with respect to the same.

This solution is, for example, described in the EP patent application 1510412, wherein a roll assembly for a vehicle is described and claimed so realized to be able to cause the breaking of the rear window in case the roll bar is actuated.

A solution suggested in the above mentioned European Patent Application '412 starts from analyses of prior art providing before some solutions, particularly for the convertible type vehicles, wherein roll bar is brought in the passenger protection position if necessary. Known solutions permit adopting this kind of roll bar in view of the fact that the cover is so provided to release open the roll bar thanks to design compromises concerning aerodynamic, design and other factors.

However, according to the EP '412 description, the need exists for a solution permitting having a deployable roll bar, and that left a higher vehicle design freedom, with particular reference to the "roof-line", and to size and positioning of the rear window, further permitting the use of a glass window.

A solution suggested according to EP patent '412 provides a roll bar with a rear window breaking device built in when roll bar is activated.

This solution (device built in the roll bar) is clearly described in the specification of the preferred embodiments and in claims (claim 1 clearly indicates that "deployable roll bar (1) has a rear window (14) breaking device (4) built in).

Another solution concerning a device for breaking the rear window is described in U.S. Pat. No. 7,198,294. This patent analyzes the above mentioned EP patent '412 in its introductive portion as most pertinent prior art.

A solution described in this patent (granted by US patent Office—with a corresponding EP patent application 1 652 736) always provides a rear window breaking device built in the roll bar (specifically in its upper surface) with a particular trimming structure permitting overcoming restraints that, according to the applicant, would characterise EP patent '412.

Particularly, a claim of US patent '294 describes a deployable roll bar with a pin projecting from its upper surface, and with a first and a second trim. It is further provided a clip that, after actuation of roll bar, moves toward second trim up to bringing said pin to project from a hole. Clip hooks roll bar, and thus cover integrally moves with roll bar toward rear window.

Solutions described in the above, besides being characterised by a limited possibility of use, also are characterised by strong restraint as far as installation of the roll bar system active toward rear window is concerned, mainly as far as minimum relative distance between roll bar and the same rear window is concerned.

SUMMARY

In this situation it is included the solution suggested according to the present invention, permitting obviating to the above drawbacks, suggesting a solution that permits providing the rear window breaking device both if roll bar is provided or not.

Furthermore, the solution according to the invention permits making trim and pin independent each other even during the breaking phase.

It is therefore specific object of the present invention to provide a device for breaking a rear window of a vehicle, the device comprising an actuation system, normally housed in a sleeping or rest position within a space which is inner with respect to the vehicle rear window, and that can be actuated, following a collision or accident involving the vehicle, a closure element for the space housing said actuation system, provided between the latter and the rear window, the closure element having a pin for breaking the rear window, the actuation system, after its activation, striking said closure element, making it moving, along with the at least one pin, toward the rear window, the actuation system and the closure element travelling with the same speed until the end of the stroke of the actuation system, the stroke ending before the actuation system contacts the rear window, the closure element, along with the at least one pin, further prosecuting its stroke until striking the rear window, breaking the same.

Particularly, according to the invention, the actuation system can be comprised of the vehicle roll bar.

Always according to the invention, the actuation system can be comprised of a mechanic and/or hydraulic and/or magnetic and/or pneumatic and/or pyrotechnic type.

Still according to the invention, the closure element can be comprised of a vehicle finishing element.

Furthermore according to the invention, means can be provided, preferably cords or like, for constraining said closure element with the vehicle at the end of its stroke.

Always according to the invention, the device can provide a plurality of pins.

Furthermore, according to the invention, the at least one breaking pin is coupled with the closure element by the interposition of an elastic element, preferably a spring.

The invention further concerns a method for breaking the rear window of a vehicle in case of an accident, comprising the steps of:

activating an actuation system, normally in a sleeping position, provided within a housing of the vehicle, the actuation system being provided with a breaking pin, the housing being closed by a movable closure element, the housing being inside the rear window, making the closure element moving toward said rear window, from inside the vehicle, by the action of said activation system, but not integrally with the same;

ending the stroke of the actuation system before it contacts the rear window;

making the stroke of the closure element prosecuting and of the at least one element prosecuting until striking and breaking the rear window.

BRIEF DESCRIPTION OF THE DRAWINGS

The present invention will be now described, for illustrative but not limitative purposes, according to its preferred embodiments, with particular reference to the figures of the enclosed drawings, wherein.

DETAILED DESCRIPTION

An embodiment of the device according to the invention will be described in the following, provided on a vehicle having a roll bar, but as already clearly said, device according to the invention can also be provided on a vehicle without the roll bar.

Figure 1:
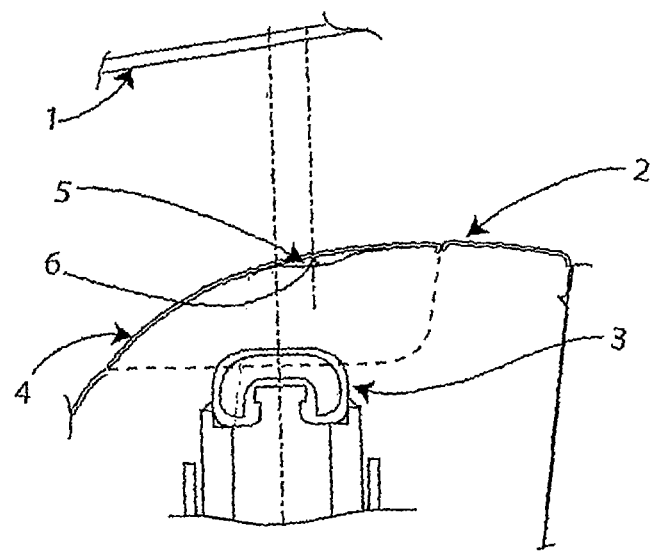
FIG. 1 schematically shows a device according to the invention during a first actuation step.
Figure 2:
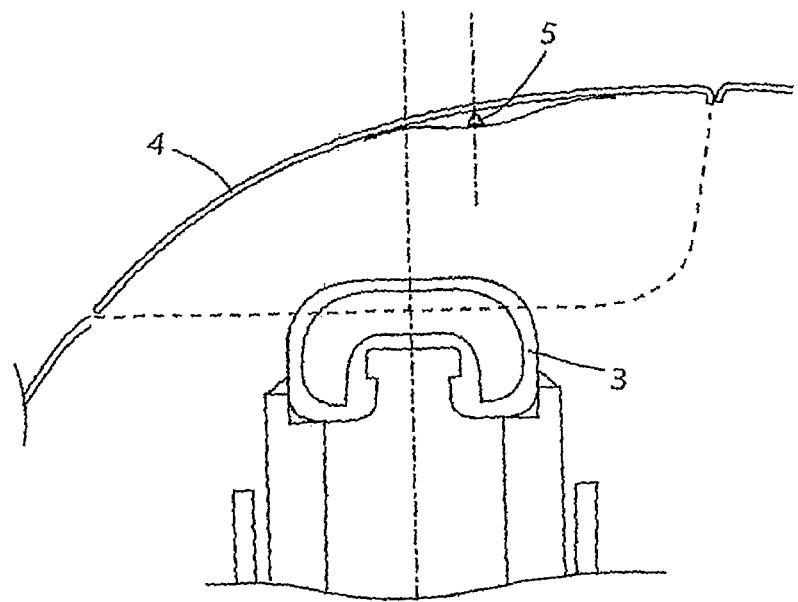
FIG. 2 shows a particular of device of FIG. 1.

Observing first FIGS. 1 and 2 of the enclosed drawings, they are schematically shown rear window 1 of the vehicle, headrest fixed read trim, "sleeper" roll bar 3, a door 4, a pin 5 and a spring 6 mounted on said door.

First, as shown in FIGS. 1 and 2, roll bar 3 is in a "sleeper" position; roll bar 3 housing is closed by door 4, which is fixed to said trim 2, and has pin 5 built in, said pin 5 being useful for breaking rear window 1.

After a crash, roll bar 3 is ejected from its housing, and along its run hits, after its actuation, door 4 of the housing projecting the same upward at the same speed.

Figure 3:
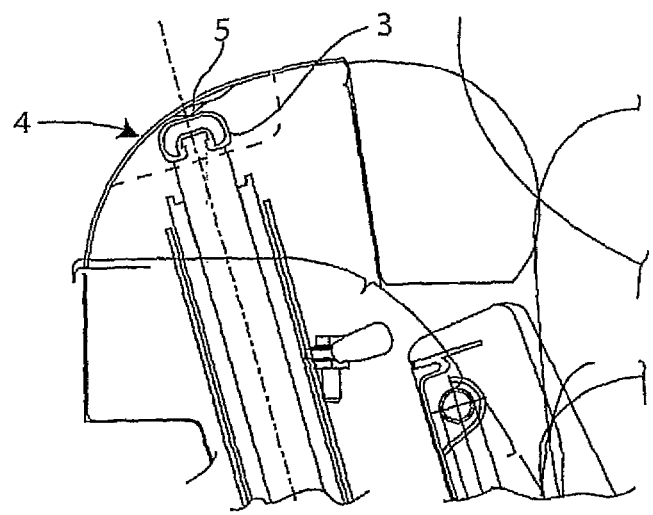
FIG. 3 schematically shows a device according to the invention during a second actuation step.
Figure 4:
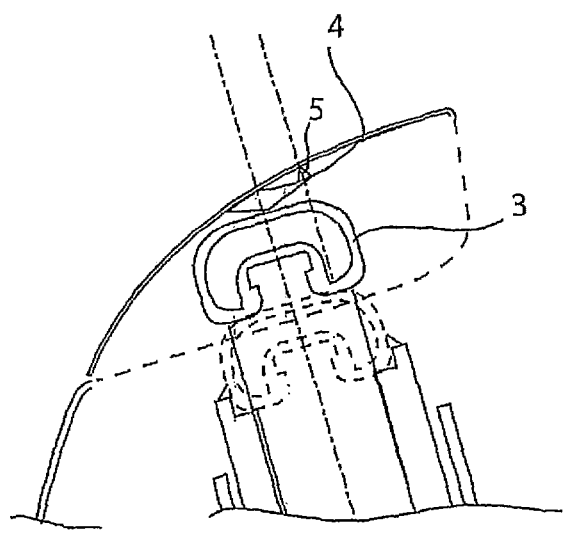
FIG. 4 shows a particular of device of FIG. 3.

During the impact of roll bar 3 against door 4, pin 5, mounted on spring 6, is pushed outside (see particularly FIGS. 3 and 4).

Figure 5:
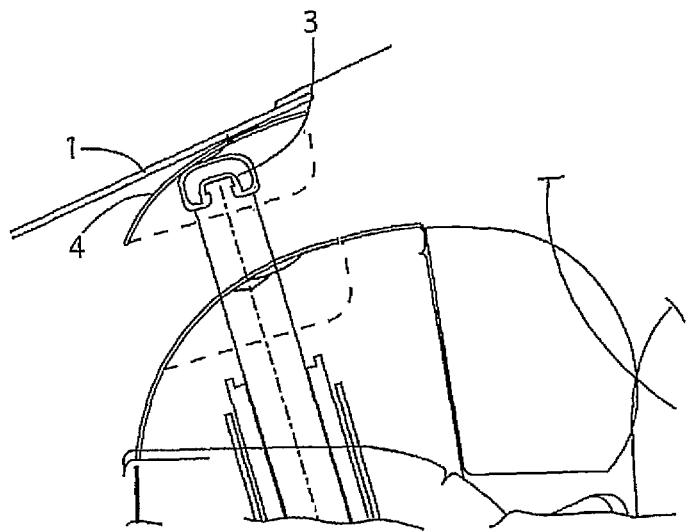
FIG. 5 schematically shows a device according to the invention during a third actuation step.
Figure 6:
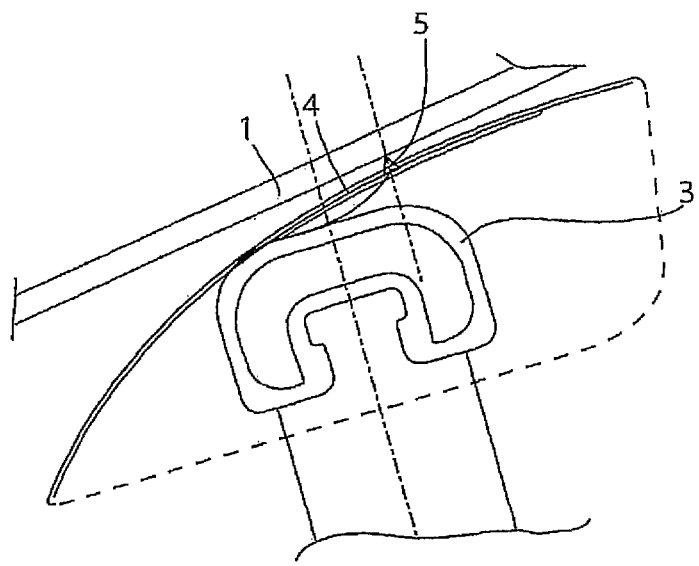
FIG. 6 shows a particular of device of FIG. 3.

Now, (see FIGS. 5 and 6), roll bar 3 and door 4 run separate, but together, each other, along their rectilinear run, and with the same speed of rear window, up to finishing the further useful run set by system, ending with breaking of rear window 1 when door 4 provided with pin contacts the same window.

Now, roll bar 3 ends its useful run, necessary for protection of passengers, while door 4 continues its run, dissipating its momentum.

Door 4 can be fixedly coupled with trim, for example by one or more cords (not shown) in order to prevent its free throwing outside.

From the above specification, solution suggested according to the present invention aims obtaining breaking of rear window if necessary, and the effect (breaking of rear window 1) is always obtained by one (or more) pins 5.

However, with respect to known solutions, pin(s) 5 is built in (inside or outside, on the basis of the specific requirements) in a closure element (door 4) of the roll bar 3 housing, which is fixed to the outer portion of the vehicle (in case of convertible vehicles, it will be an outer trim, while for not convertible vehicles it will be an inner trim).

"Door" 4 is hit by roll bar 3 during its ejection trajectory, starting moving with the same speed of roll bar 3. impact pushes 5 outside.

Roll bar 3 ends its stroke in a passenger protection position, while door 4, along with pin 5, after having broken rear window 1, still runs, dissipating its momentum.

A first important difference with respect to the known solutions is that pin 5 is not built in the roll bar 3, but in the outer trim, permitting making it independent its operation with respect to roll bar 3; breaking pin 5 can be actuated by any other actuation system wherein the item 3 in the drawings is not a roll bar but rather is a linear actuation system that does not function as a roll bar.

Furthermore, during the movement toward the rear window 1, roll bar 3 and door 4/pin 5 move together, but not integrally coupled each other, as instead clearly provided in the prior art solutions clearly providing that breaking pin is built in the roll bar.

This solution permits realising device according to the present invention independently with respect to the presence of roll bar.

Furthermore, a solution according to the present invention does not provide a double trim and does not provide a clip to make trim and roll bar integral each other after roll bar actuation, as described and claimed in the above mentioned US patent '294, thus making inventive device solution much more simple and functional.

The present invention has been described for illustrative but not limitative purposes, according to its preferred embodiments, but it is to be understood that modifications and/or changes can be introduced by those skilled in the art without departing from the relevant scope as defined in the enclosed claims.

The invention claimed is:

1. A device for breaking a rear window of a vehicle, said device comprising
    an actuation system, normally housed in a sleeping or rest position within a space which is inner with respect to said vehicle rear window, and that is actuatable, following a collision or accident involving said vehicle, and
    a closure element for covering said actuation system, provided between the actuation system and the rear window, said closure element including at least one pin for breaking the rear window,
    wherein said actuation system, after its activation, is positioned to strike said closure element, along with said at least one pin, and is positioned to then strike said rear window, such that said actuation system and said closure element travel with the same speed until the end of a stroke of the actuation system, said stroke ending before the actuation system contacts the rear window, and such that said closure element, along with said at least one pin, further prosecutes the stroke until striking the rear window, thereby breaking the rear window.

2. The device according to claim 1, wherein the actuation system is provided as a portion of a vehicle roll bar.

3. The device according to claim 1, wherein said actuation system is selected from the group consisting of mechanic and hydraulic and magnetic and pneumatic and pyrotechnic actuation systems.

4. The device according to claim 1, wherein said closure element is comprised of a vehicle finishing element.

5. The device according to claim 1, wherein means are provided for constraining said closure element with the vehicle at the end of the stroke.

6. The device according to claim 5, wherein said means for constraining said closure element with the vehicle at the end of the stroke are comprised of cords.

7. The device according to claim 1, wherein said device includes a plurality of pins.

8. The device according to claim 1, wherein said at least one pin is coupled with said closure element by the interposition of an elastic element.

9. A method for breaking a rear window of a vehicle, comprising the steps of:
    activating an actuation system, normally in a sleeping position, provided within a housing of the vehicle, said housing being provided with at least one breaking pin, said housing being closed by a movable closure element that is not integral with the actuation system, and said housing being inside the rear window, causing said closure element to move toward said rear window, from inside the vehicle, by a stroke of said actuation system;
ending the stroke of the actuation system before the actuation system contacts the rear window; and
permitting a stroke of the closure element and of said at least one breaking pin to strike and break said rear window.

\* \* \* \* \*